(12) United States Patent
Rota et al.

(10) Patent No.: US 9,997,061 B2
(45) Date of Patent: Jun. 12, 2018

(54) MULTI-DEVICE SYSTEM WITH SIMPLIFIED COMMUNICATION

(71) Applicant: The Swatch Group Research and Development Ltd, Marin (CH)

(72) Inventors: Sergio Rota, Colombier (CH); Zoran Randjelovic, Marin (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days. days.

(21) Appl. No.: 14/782,490

(22) PCT Filed: Apr. 23, 2014

(86) PCT No.: PCT/EP2014/058278
§ 371 (c)(1),
(2) Date: Oct. 5, 2015

(87) PCT Pub. No.: WO2014/173977
PCT Pub. Date: Oct. 30, 2014

(65) Prior Publication Data
US 2016/0049072 A1 Feb. 18, 2016

(30) Foreign Application Priority Data
Apr. 24, 2013 (EP) .................................... 13165189

(51) Int. Cl.
G08C 17/02 (2006.01)
G06F 17/30 (2006.01)
H04W 4/00 (2018.01)

(52) U.S. Cl.
CPC ........... *G08C 17/02* (2013.01); *G06F 17/301* (2013.01); *H04W 4/008* (2013.01)

(58) Field of Classification Search
CPC ........................... H04M 1/7253; H04W 4/008
See application file for complete search history.

(56) References Cited

U.S. PATENT DOCUMENTS 7,406,270 B2 * 7/2008 Miyazawa ......... H04N 1/00209
358/1.15
7,589,642 B1 * 9/2009 Mui ....................... G08C 17/00
340/12.3

(Continued)

FOREIGN PATENT DOCUMENTS

WO    WO 2007/111653 A1    10/2007

OTHER PUBLICATIONS

International Search Report dated Jul. 15, 2014, in PCT/EP2014/058278 filed Apr. 23, 2014.

*Primary Examiner* — Cindy Trandai
(74) *Attorney, Agent, or Firm* — Oblon, McClelland, Maier & Neustadt, L.L.P.

(57) ABSTRACT

A system including at least a first command issuing device and at least one second command receiving device, each including a control unit and a short-range radio communication unit, the system configured to use at least a first functional profile allowing execution of a first function, the first profile allowing the first device to generate a first coded message, the first function being executed by the at least one second command receiving device upon receipt of the first coded message by the second device. The system is further configured such that the second command receiving device can execute a second function in response to receipt of the first coded message.

10 Claims, 1 Drawing Sheet

(56) References Cited

U.S. PATENT DOCUMENTS

| | | | |
|---|---|---|---|
| 2004/0048605 A1* | 3/2004 | Schaefer | G08B 1/08 |
| | | | 455/414.2 |
| 2005/0001024 A1* | 1/2005 | Kusaka | H04N 1/00281 |
| | | | 235/375 |
| 2005/0090231 A1* | 4/2005 | Huberman | H04W 24/00 |
| | | | 455/411 |
| 2007/0238484 A1 | 10/2007 | Liu | |
| 2007/0249288 A1 | 10/2007 | Moallemi et al. | |
| 2008/0081559 A1* | 4/2008 | Parikh | H04W 88/06 |
| | | | 455/41.2 |
| 2008/0155022 A1* | 6/2008 | Suzuki | G06F 9/485 |
| | | | 709/205 |
| 2009/0061769 A1* | 3/2009 | Zimbric | H04M 1/7253 |
| | | | 455/41.2 |
| 2009/0061775 A1* | 3/2009 | Warren | H04M 1/6091 |
| | | | 455/41.2 |
| 2009/0207013 A1* | 8/2009 | Ayed | G08B 13/1427 |
| | | | 340/539.1 |
| 2012/0127011 A1* | 5/2012 | Lee | H04L 67/025 |
| | | | 341/176 |
| 2013/0227460 A1* | 8/2013 | Jawerth | G06F 3/04883 |
| | | | 715/773 |
| 2014/0092806 A1* | 4/2014 | Kidron | H04W 40/02 |
| | | | 370/328 |
| 2014/0204229 A1* | 7/2014 | Leung | H04N 5/23203 |
| | | | 348/211.2 |
| 2014/0266583 A1* | 9/2014 | Lopez | G07C 9/00857 |
| | | | 340/5.26 |
| 2014/0282257 A1* | 9/2014 | Nixon | G05B 11/01 |
| | | | 715/835 |

* cited by examiner

MULTI-DEVICE SYSTEM WITH SIMPLIFIED COMMUNICATION

CROSS-REFERENCE TO RELATED APPLICATIONS

This is a National Phase Application in the United States of International Patent application PCT/EP2014/058278 filed Apr. 23, 2014 which claims priority on European patent application No. 13165189.5 filed Apr. 24, 2013. The entire disclosures of the above patent applications are hereby incorporated by reference.

The present invention concerns a system including at least a first command issuing device and at least a second command receiving device, each including a control unit and a short-range radio communication unit, said system being arranged to use at least a first functional profile allowing execution of a first function, said first profile allowing said first device to generate a first coded message, said first function being executed by said at least one second command receiving device, upon receipt of the first coded message by said second device.

BACKGROUND OF THE INVENTION

The Bluetooth protocol is a specification of the telecommunications industry. It uses a short-range radio technology designed to simplify connections between electronic devices. It was designed to replace cables between computers and printers. The protocol has been extended to portable electronic devices such as portable music players and mobile telephones.

This specification allows devices to communicate at short range to exchange data or commands. For example, the Bluetooth protocol can connect a computer to a mouse wirelessly. The Bluetooth protocol is a standard for achieving interoperability between the various brands that are involved in or use the Bluetooth protocol.

Various profiles are created in the Bluetooth protocol. A profile is a functional specification of a particular use, i.e. a function. The profiles may also correspond to various types of peripheral equipment. The purpose of the profiles is to ensure interoperability between all Bluetooth devices.

Thus, a profile concerning a function is used in every device that uses that function so that, regardless of the brand of the product, the function can always be activated. These profiles define:
  how to implement a defined use
  the specific protocols to be used
  the constraints and value ranges of these protocols One drawback of this system is that creation of a new function requires creation of a new profile with all the complexity that this involves. Indeed, the operation to create a profile must take account of constraints such as interoperability between all Bluetooth devices using the function. Profile creation therefore results in considerable costs in terms of money and time.

SUMMARY OF THE INVENTION

It is an object of the invention to overcome the drawbacks of the prior art by providing a system using Bluetooth technology which operates and integrates new functions more simply.

To this end, the present invention concerns a system including at least a first command issuing device and at least one second command receiving device, each including a control unit and a short-range radio communication unit, said system being arranged to use at least a first functional profile allowing execution of a first function, said first profile allowing said first device to generate a first coded message, said first function being executed by said at least one second command receiving device upon receipt of the first coded message by said second device, characterized in that the system is configured such that the second command receiving device can execute a second function in response to receipt of the first coded message.

In a first advantageous embodiment, the first profile allows said first device to generate a first coded message and a second coded message respectively allowing execution of a first function and a second function.

In a second advantageous embodiment, the first function is an object search function and the second function is a photo function.

In a third advantageous embodiment, the first device is a watch and the second device is a touch tablet.

In another advantageous embodiment, the first device is a touch tablet and the second device is a watch.

In another advantageous embodiment, the system includes at least a first command issuing device and at least two second command receiving devices each able to execute a function in response to receipt of the first coded message and said first device is arranged to send said first coded message specifically to only one of the second command receiving devices.

BRIEF DESCRIPTION OF THE DRAWINGS

The objects, advantages and features of the system according to the present invention will appear more clearly in the following detailed description of at least one embodiment of the invention, given solely by way of non-limiting example and illustrated by the annexed drawings, in which.

DETAILED DESCRIPTION

Figure 1:
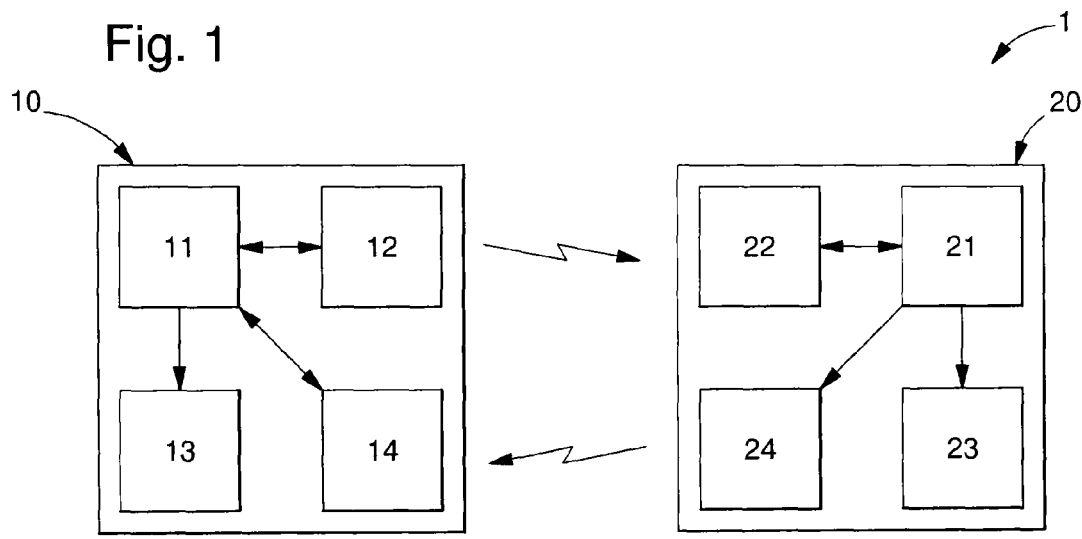
FIG. 1 is a schematic view of a system of devices according to the invention.

FIG. 1 shows a system according to the present invention. This system 1 includes at least two devices 10, 20 such as a mobile telephone or a computer or a touch tablet or a watch. It is understood that the system includes a first device 10 and a second device 20.

Each of these devices is provided with a central unit 11, 21 for controlling said device, a memory area 13, 23 for the storage of data and commands and a communication circuit 12 22, capable of receiving and transmitting data or commands. This communication circuit 12, 22 is arranged to operate in accordance with a particular communication protocol, such as the Bluetooth protocol used for short distances and using a frequency of 2.4 GHz. Each of devices 10, 20 further includes display means 14, 24. It will be assumed that system 1 includes a command issuing device which will be first device 10 and a command receiving device which will be second device 20.

The following description will take the example of a system 1 with two devices, such as an electronic touch watch and a touch tablet of the iPad® type. The electronic watch is provided with an LCD screen for the display and touch and/or conventional keys for controlling the watch. The touch tablet is provided with a LCD touch screen and a camera for video calls? or taking photographs. The electronic watch is the first device used to control the second device which is the touch tablet.

These devices 10, 20 are also configured to be capable of executing a certain number of functions. It is understood therefore that multiple profiles PRO are used for these various functions.

These profiles PRO take the form of software and have a first part integrated in first device 10 and a second part integrated in second device 20. It will be assumed that the first part is included in command issuing device or first device 10 and that the second portion is incorporated in the command receiving device or second device 20. Consequently, the first and second parts cooperate with each other so that first device 10, and particularly the first part of the profile used sends a command which will be interpreted by the second part of the profile used.

Figure 2:
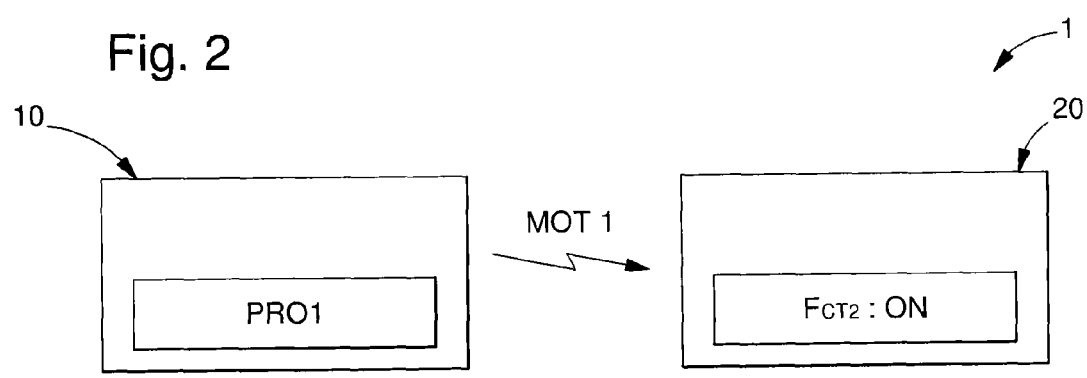
FIG. 2 schematically shows the operation of a system of devices according to the invention.

Advantageously according to the invention, the second device 20 or command receiving device is programmed so that the second part of the profile executes a function other than that linked to said profile. This means that system 1 provided with two devices 10, 20 is configured to use a first profile PRO1 used for operation of a first function FCT1 but that the command receiving device uses this first profile PRO1 to activate a second function FCT2 as seen in FIG. 2. For example, the profile used for the key search function is used for a photo.

Indeed, for such a key search function, the operation is as follows. When the function is activated, the command giving device sends a coded message MOT1 to the command receiving device indicating that the function is activated. Consequently, the two devices will use the Bluetooth protocol to determine the distance between them, so that if the distance exceeds a pre-programmed value, the command receiving device 20 emits a light or sound signal. The coded message MOT1 is thus the message specific to profile PRO1.

The invention therefore consists in using this coded message MOT1 for a second function FCT2.

Consequently, the second part of the profile is modified so that a second function FCT2 is executed instead of first function FCT1. For example, this second part can be downloaded via a free or paid application or directly incorporated in the operating software of the device.

The first step is to activate the second function FCT2, that is to say that the corresponding application is running but not performing any operations. This second function FCT2 can run as soon as command receiving device 20 is switched on. The second step occurs when command receiving device 20 receives the coded message MOT1, said command receiving device 20 will then execute the operations of the function. In the example where the second function FCT2 is a photo function, the first step consists in opening the photo application in command receiving device 20. The second step consists, after receiving coded message MOT1, in operating the photo function, i.e. in taking a photo with the camera of said device.

Figure 3:
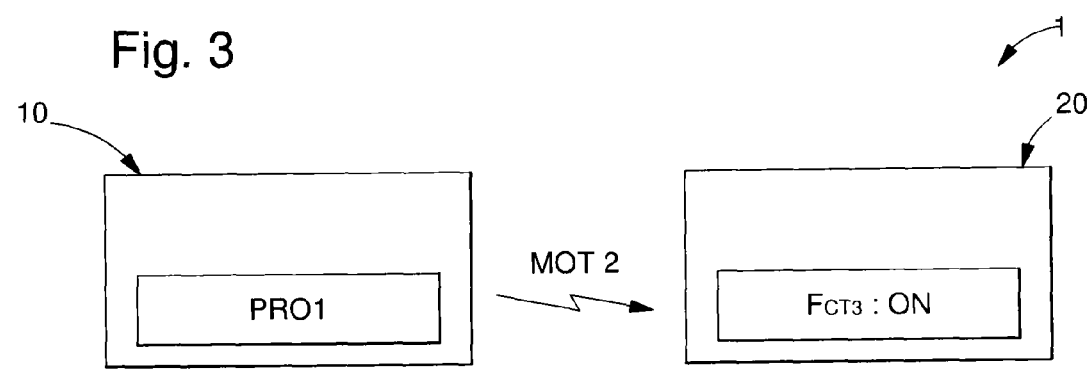
FIG. 3 schematically shows an alternative mode of operation of a system of devices according to the invention.

In a variant visible in FIG. 3, the profile used is a profile having several levels. A profile having several levels is a profile that can communicate with several coded messages MOT1, MOT2, etc. . . .

This variant thus has the advantage of allowing the same profile to be used for different functions. Indeed, the different functions of command receiving device 20 are programmed to react to only one of the coded profile messages. For example, a first profile PRO1 has two coded messages MOT1 and MOT2. The functions can be programmed so that the first coded message MOT1 is used for a first function FCT1 and so that the second coded message MOT2 is used for a second function FCT2. Hence, if both functions are activated, receipt of first coded message MOT1 or of second coded message MOT2 will result in the execution of first function FCT1 or of second function FCT2.

In another variant, system 1 may comprise several command receiving devices 20. Each of these command receiving devices 20 is able to execute a function FCT reacting to the first coded message MOT1 generated by the first profile PRO1 of the first device. These functions FCT may be different from one command receiving device 20 to another.

Thus, the command issuing device 10 is configured to be able to send the first coded word MOT1 to only one of command receiving devices 20.

Consequently, when the user utilises command issuing device 10 to select and activate a function FCT, command issuing device 10 pre-selects the appropriate command receiving device 20 and sends first coded message MOT1 thereto so that the selected command receiving device 20 can execute its function. It will be understood that the first coded message MOT1 may include a code that only the appropriate command receiving device 20 can read and interpret.

It will be clear that various alterations and/or improvements and/or combinations evident to those skilled in the art may be made to the various embodiments of the invention set out above without departing from the scope of the invention defined by the annexed claims.

The invention claimed is:

1. A system comprising:
   at least a first command issuing device and at least one second command receiving device, each including control circuitry and short-range radio communication circuitry; and
   a first functional profile allowing execution of a first function,
   wherein the system is configured to use at least the first functional profile allowing execution of the first function,
   wherein the first functional profile allows the first command issuing device to generate a first coded message,
   wherein the first function is executed by the at least one second command receiving device upon receipt of the first coded message by the second device, and
   wherein the system is configured such that the second command receiving device uses the first functional profile to execute a second function, different from the first function, in response to receipt of the first coded message,
   wherein the first functional profile specifies general behaviors that the first command issuing device and the at least one second command receiving device use for communication and execution of functions,
   wherein the first functional profile is a Bluetooth device profile, and
   wherein the first function and the second function, different from the first function, are both executed by the second command receiving device upon receipt of the first coded message generated by the first command issuing device.

2. The system according to claim 1, wherein the first functional profile allows the first command issuing device to generate a first coded message and a second coded message respectively allowing execution of the first function and the second function.

3. The system according to claim 1, wherein the first function is an object search function and the second function is a photo function.

4. The system according to claim 2, wherein the first function is an object search function and the second function is a photo function.

5. The system according to claim 1, wherein the first command issuing device is a watch and the second device is a touch tablet.

6. The system according to claim 1, wherein the first command issuing device is a touch tablet and the second device is a watch.

7. The system according to claim 1, wherein the system further comprises at least two second command receiving devices each configured to execute the second function in response to receipt of the first coded message and the first command issuing device is configured to send the first coded message specifically to only one of the second command receiving devices.

8. The system according to claim 1, wherein the first command issuing device is an electronic touch watch and the second device is a touch tablet.

9. The system according to claim 1, wherein the first functional profile used for operation of the first function is used in the second command receiving device to activate a second function for which the first function is a key search function, and the second function is a photo function.

10. The system according to claim 1, wherein the first functional profile takes the form of software and has a first part integrated in the first command issuing device and a second part integrated in the second command receiving device, wherein the second command receiving device is programmed so that the second part of the first functional profile executes a function other than that linked to the first functional profile.

* * * * *